US006276811B1

(12) United States Patent
Yoshimori et al.

(10) Patent No.: US 6,276,811 B1
(45) Date of Patent: Aug. 21, 2001

(54) PROJECTOR AND ITS TELESCOPIC POST

(75) Inventors: Tokujin Yoshimori, Tokyo; Masayuki Taguchi, Saitama-ken, both of (JP)

(73) Assignee: Green Service Co., Ltd., Tokyo (JP)

( * ) Notice: Subject to any disclaimer, the term of this patent is extended or adjusted under 35 U.S.C. 154(b) by 0 days.

(21) Appl. No.: 09/302,317

(22) Filed: Apr. 29, 1999

(30) Foreign Application Priority Data

Apr. 30, 1998 (JP) ........ 10-121087
Oct. 23, 1998 (JP) ........ 10-302708

(51) Int. Cl.[7] ........ B60Q 1/00; B60Q 1/26

(52) U.S. Cl. ........ 362/192; 362/431; 362/403; 362/385; 362/414; 362/250; 362/238; 362/233; 362/171

(58) Field of Search ........ 362/192, 431, 362/171, 403, 385, 413, 414, 153.1, 250, 238, 233

(56) References Cited

U.S. PATENT DOCUMENTS

| | | | | |
|---|---|---|---|---|
| 4,181,929 | * | 1/1980 | Barber et al. | 362/192 |
| 4,220,981 | * | 9/1980 | Koether | 362/61 |
| 5,031,085 | * | 7/1991 | Rustin | 362/401 |
| 5,808,450 | * | 9/1998 | Chula et al. | 322/22 |

FOREIGN PATENT DOCUMENTS

| | | | |
|---|---|---|---|
| 7-331926 | | 12/1995 | (JP) . |
| 8-184217 | * | 7/1996 | (JP) . |
| 9-161503 | | 6/1997 | (JP) . |
| 10-172337 | | 6/1998 | (JP) . |

* cited by examiner

*Primary Examiner*—Stephen Husar
*Assistant Examiner*—Ali Alavi
(74) *Attorney, Agent, or Firm*—Darby & Darby

(57) ABSTRACT

The problem of the present invention resides in providing a projector having a telescopic post which is easy to deal with a multiple stage structure, capable of setting illumination devices at high positions, sufficiently considering also of safety and excellent in operability. The resolving means is as follows. There is provided a telescopic post in which a plurality of middle pipe posts having successively reduced inner diameters are ascendably and descendably inserted into a base pipe post fixed to a carriage and the respective middle pipe posts are ascended and extended by elastic force of built-in gas dampers. The gas dampers are of a gas damper structure of a tandem type connected in a vertical direction in the telescopic post. There is provided an elongation and contraction regulating means of the gas dampers having a handle rotated regularly and reversely, a mechanism of extending the telescopic post by rotating the handle in a regular direction and a mechanism of contracting the telescopic post by rotating the handle in a reverse direction.

10 Claims, 8 Drawing Sheets

PROJECTOR AND ITS TELESCOPIC POST

BACKGROUND OF THE INVENTION

1. Field of the Invention

The present invention relates to a projector mainly used as illumination of road construction or the like in the nighttime, particularly to a telescopic structure of a telescopic post (hereinafter, may simply be referred to as "post") erected on a carriage.

2. Description of the Prior Art

Conventionally, there has been known a projector in which a telescopic post is erected on a carriage mounted with a generator and a required number of illumination devices are mounted at an upper portion of the telescopic post (for example, refer to JP-A-7-331926).

Further, there is generally known a telescopic post constituting a projector of this kind. As shown by, for example, FIG. 9 in which a base pipe post 100 fixed vertically on an upper face of a carriage, not illustrated, is successively inserted with ascendably and descendably a plurality of middle pipe posts 101 and 102 having inner diameters successively reduced relative to the base pipe post, a first pulley 103 is attached to an upper portion of an inner face of the base pipe post 100, a second pulley 104 is attached to an upper portion of an inner face of the middle pipe post 101 at a lower stage, respectively, the first pulley 103 is hung with a first wire 105 one end of which is connected to a lower portion of the middle pipe post 101 at the lower stage and other end of which is fixed to a hoisting drum of a winch 107 whereas the second pulley 104 is hung with a second wire 106 one end of which is fixed to a lower portion of the middle pipe post 102 at an upper stage and other end of which is fixed to an upper portion of the base pipe post 100.

According to the telescopic post, the middle pipe posts 101 and 102 are ascended to extend by reeling in the wire 105 by manually or electrically turning the winch 107 whereas the middle pipe posts 101 and 102 are descended to contract by reeling out the wire 105 by which the height of the illumination devices attached at an upper end of the middle pipe post 102 can pertinently be adjusted.

However, according to the projector using the telescopic post, all of weight of the middle pipe posts 101 and 102 as well as the illumination devices attached to the upper end, attachment metal pieces thereof and so on is exerted on the wire 105 reeled by the winch 107 and when, for example, the illumination devices are two lamps, the total load exceeds 10 kg. Hence, normally, a force required for reeling operation is alleviated by a speed reducing mechanism built in the winch 107, however, on the other side, there poses a problem in which the extracting and retracting speed of the post is retarded.

Further, in order to reduce the load, it is conceivable to make the respective middle pipe posts 101 and 102 slender and provide vertical grooves slidable by the pulleys 103 and 104 at the side faces of the pipe posts 101 and 102. However, in that case, there is a concern of deteriorating the strength of the post. Further, the vertical grooves are exposed in a state where the post is extended and accordingly, not only the outlook is deteriorated but also rain water, dust or the like is liable to invade the inside of the post which gives rise to a concern of causing failure or contamination.

In the meantime, the applicant has previously proposed a telescopic post using a gas damper in place of a winch, mentioned above, in order to considerably promote an operability in extracting and retracting the telescopic post, mentioned above (refer to JP-A-8-184217).

According to the telescopic post, as shown by FIG. 8, a base pipe post 110 is inserted successively ascendably and descendably with a plurality of, in this case, two of middle pipe posts 111 and 112 at a lower stage and at an upper stage having inner diameters successively reduced relative to the base pipe post 110, a gas damper 114 is built in the base pipe post 110 such that a side of extracting and retracting a rod 113 is directed downwardly, the gas damper 114 is erected at inside of the base pipe post 110 by fixing a rod tip portion 115 to an inner bottom portion of the base pipe post 110 and a first pulley 116 is installed above the gas damper 114. The first pulley 116 is hung with a first wire 117 one end of which is fixed to a lower portion of the base pipe post 110 and other end of which is fixed to a lower portion of the middle pipe post 111 at the lower stage, whereas a second pulley 118 is arranged at an upper inner portion of the middle pipe post 111 at the lower stage and the second pulley 118 is hung with a second wire 119 one end of which is fixed to a lower portion of the middle pipe post 112 at the upper stage and other end of which is fixed to a lower portion of the base pipe post 110.

According to the telescopic post, elastic force of the gas damper 114 in a contracted state is set to be substantially equal to load applied on the first pulley 116 in the telescopic post in a contracted state. By operating upwardly and downwardly a handle 120 installed at the middle pipe post 111 the post can be extended and contracted swiftly by utilizing the elastic force of the gas damper 114 without carrying out operation of reeling in and reeling out the wires. Further, the operation for extending and contracting the post can be carried out by small force utilizing effectively the spring force of the gas damper.

According to the telescopic post described above, in addition to the fact that the plurality of middle pipe posts can be moved upwardly and downwardly by utilizing the spring force of the gas damper, by containing the gas damper and the pulleys at hollow inner portions of the respective pipe posts, the respective pipe posts are made slender without providing notches and the weight can be reduced while ensuring the strength of the post. As a result, there is achieved an advantage in which extraction and retraction of the post can swiftly be carried out by simple moving up and down operation. Further, there is achieved a significant effect in which the outlook is excellent and there is no concern of invading of rain water, dust or the like to inside of the post since the ascending mechanism is not exposed to outside. However, there remain a few points of improvement in dealing with a mode of use shown below.

That is, according to the conventional gas damper type telescopic post, in the contracted state, the load applied on the gas damper and the elastic force of the gas damper are balanced, the balance is collapsed by moving up the handle 120 by an operator, the post is extended by the elastic force of the gas damper and the post is contracted by moving down the handle 120 against the elastic force. However, when a telescopic post having a multiple stage structure of four stages or more is formed in order to install the illumination devices at a higher location, the extending and contracting operation by moving up and down the handle 120 becomes difficult.

Further, according to the telescopic post having the multiple stage structure, a gas damper having a larger stroke is used and accordingly, sufficient consideration is needed in view of safety.

SUMMARY OF THE INVENTION

The present invention has been carried out in view of the above-described conventional situation and it is an object of the present invention to provide a telescopic post which can extremely easily deal with a multiple stage structure, can set an illumination device at a higher location, can give sufficient consideration also in safety and excellent in operability in addition to effects provided by the conventional gas damper type telescopic post proposed by the applicant.

In order to achieve the above-described problem, according to a first feature of the present invention, there is provided a projector in which a telescopic post having a required number of illumination devices is erected on a carriage and the telescopic post is formed such that at least one middle pipe post having a successively reduced inner diameter is inserted ascendably and descendably into a base pipe post fixed on the carriage and each of the middle pipe post is ascended and extended by an elastic force of built-in gas dampers, characterized in that the gas dampers are gas dampers in a tandem type connected in a vertical direction in the telescopic post.

According to the tandem type gas damper structure, the multiple stage elongation and contraction structure can easily be dealt with and the illumination device or the like can be set at a higher location. Further, compared with the case of using a long single type gas damper, the load applied on cylinder rods of the individual gas dampers is dispersed and there is constituted a structure in which sufficient consideration is given also to safety.

According to a second feature of the invention, the projector further comprises regulating means for regulating elongation and contraction of the gas dampers and the regulating means includes a handle rotated regularly and reversely, a mechanism of extending the telescopic post by rotating the handle in a regular direction and a mechanism of contracting the telescopic post by rotating the handle in a reverse direction.

According to such a constitution, in addition to the fact that the multiple type telescopic post can smoothly be extended and contracted by using the elastic force of the gas dampers, elongation and contraction of the elongation and contraction posts and elongation and contraction of the gas dampers are synchronized with each other by the operation of the handle, in other words, the telescopic post is not elongated or contracted so far as the handle is not operated and accordingly, locking of the contracted state of the telescopic post and locking of the extended state can pertinently be controlled.

According to a third feature of the present invention, the projector further comprises a drive gear and a driven gear at a side face of the base pipe post, an ascending and descending member installed at a middle portion of an endless member hung between the two gears is fixed at the middle pipe post at a lowermost stage, wherein the drive gear is connected to a handle via a drive shaft, the drive gear is rotated to an ascending side by regularly rotating the handle to thereby ascend the middle pipe post at the lowermost stage along with the ascending and descending member, the elastic force of the gas dampers is operated to thereby extend the telescopic post and in the meantime, the drive gear is rotated to a descending side by reversely rotating the handle to thereby descend the middle pipe post at the lowermost stage along with the ascending and descending member to thereby contract the telescopic post. The drive shaft is installed with an ascending brake mechanism for regulating rotation of the drive gear to the ascending side when the ascending and descending member is disposed at a descended position (when the telescopic post is in the contracted state) and a descending brake mechanism for regulating rotation of the drive shaft to 'the descending side when the ascending and descending member is disposed at an ascended position (when the telescopic post is in the elongated state).

In this case, in contracting the telescopic post, the ascending and descending member is at the descended position, from the state, by the regular rotational operation of the handle, the middle pipe post at the lowermost stage is ascended along with the ascending and descending member, elastic force of the gas dampers is operated and the telescopic post is extended. At the time point in which the ascending and descending member is moved to the ascended position,'the state in which the gas dampers are fully extended, that is, the state in which the telescopic post is extended is brought about. From the state, by the reverse rotational operation of the handle, the middle pipe post at the lowermost stage is descended along with the ascending and descending member, the gas dampers are also contracted and the telescopic post is contracted.

Further, in the contracted state of the telescopic post, by the ascending brake mechanism, rotation of the drive gear to the ascending side is regulated, unprepared extension of the telescopic post is prevented, in the extended state of the telescopic post, by the descending brake mechanism, rotation of the drive gear to the descending side is regulated and unprepared contraction (fall) of the telescopic post is prevented.

Further, the handle operation is to rotate the endless member hung between the drive gear and the driven gear and accordingly, the load exerted on the handle operation is small and the telescopic post can be elongated and contracted by a small amount of rotational operation.

According to a fourth feature of the present invention, the drive shaft is formed with an ascending/descending brake mechanism rotatably mounted with a descending brake ratchet wheel rotatable only to the ascending side and an ascending brake ratchet wheel rotatable only to the descending side and installed with hold plates on a descending brake side for getting proximate to each other in accordance with rotation of the drive shaft to t he ascending sid e to thereby pinch the descending brake ratchet wheel and separating from each other in accordance with rotation of the drive shaft to the descending side and hold plates on an ascending brake side for getting proximate to each other in accordance with the rotation of the drive shaft to a descending side to thereby pinch the ascending brake rachet wheel and separating from each other in accordance with rotation of the drive shaft to the ascending side.

According to a fifth feature of the invention, a screw shaft is erected to be proximate to the base pipe post, the base pipe post is installed with a winch for rotating the screw shaft in regular and reverse directions, a screwing member fitted screwably to the screw shaft is slidably inserted into a guide hole installed along a height direction of the base pipe post and engaged with a lower end portion of the middle pipe post at the lowermost stage and the gas dampers are elongated and contracted in synchronism with ascending and descending of the screwing member by operating the winch to thereby elongate and contract the telescopic post.

In this case, the multiple stage telescopic post can smoothly be elongated and contracted by utilizing the elastic force of the gas dampers and elongation and contraction of the gas dampers can pertinently be controlled by the screw shaft and the screwing member. Further, by stopping the screwing member at a predetermined position of the screw shaft, the extended height of the telescopic post can arbitrarily be adjusted.

According to a sixth feature of the present invention, there is provided a telescopic post which is a telescopic post formed such that at least one middle pipe post having a successively reduced inner diameter is ascendably and descendably inserted into a base pipe post and the respective middle pipe post is ascended and extended by an elastic force of built-in gas dampers, the telescopic post comprising a drive gear and a driven gear installed at a side face of the base pipe post, wherein an ascending and descending member installed at a middle portion of an endless member hung between the two gears is fixed to the middle pipe post at a lowermost stage, the drive gear is connected to a handle via a drive shaft and formed such that the drive gear is rotated to an ascending side by regularly rotating the handle to thereby ascend the middle pipe post at the lowermost stage along with the ascending and descending member and extend the telescopic post by operating the elastic force of the gas dampers and in the meantime, the drive gear is rotated to a descending side by reversely rotating the handle to thereby descend the middle pipe at the lowermost stage along with the ascending and descending member to thereby contract the telescopic post and the drive shaft is installed with an ascending/descending brake mechanism for regulating rotation of the drive shaft to the ascending side when the ascending and descending member is disposed at a descended position and in the meantime, regulating rotation of the drive gear to the descending side when the ascending and descending member is disposed at an ascended position.

The telescopic post is not necessarily limited to one member constituting a projector but can deal with, for example, a case in which a sound device of a speaker or the like or other facility device is attached at an upper location and the telescopic post includes such a mode of use.

DESCRIPTION OF THE PREFERRED EMBODIMENT(S)

An explanation will be given of embodiments of the present invention in reference to the drawings as follows.

Figure 1:
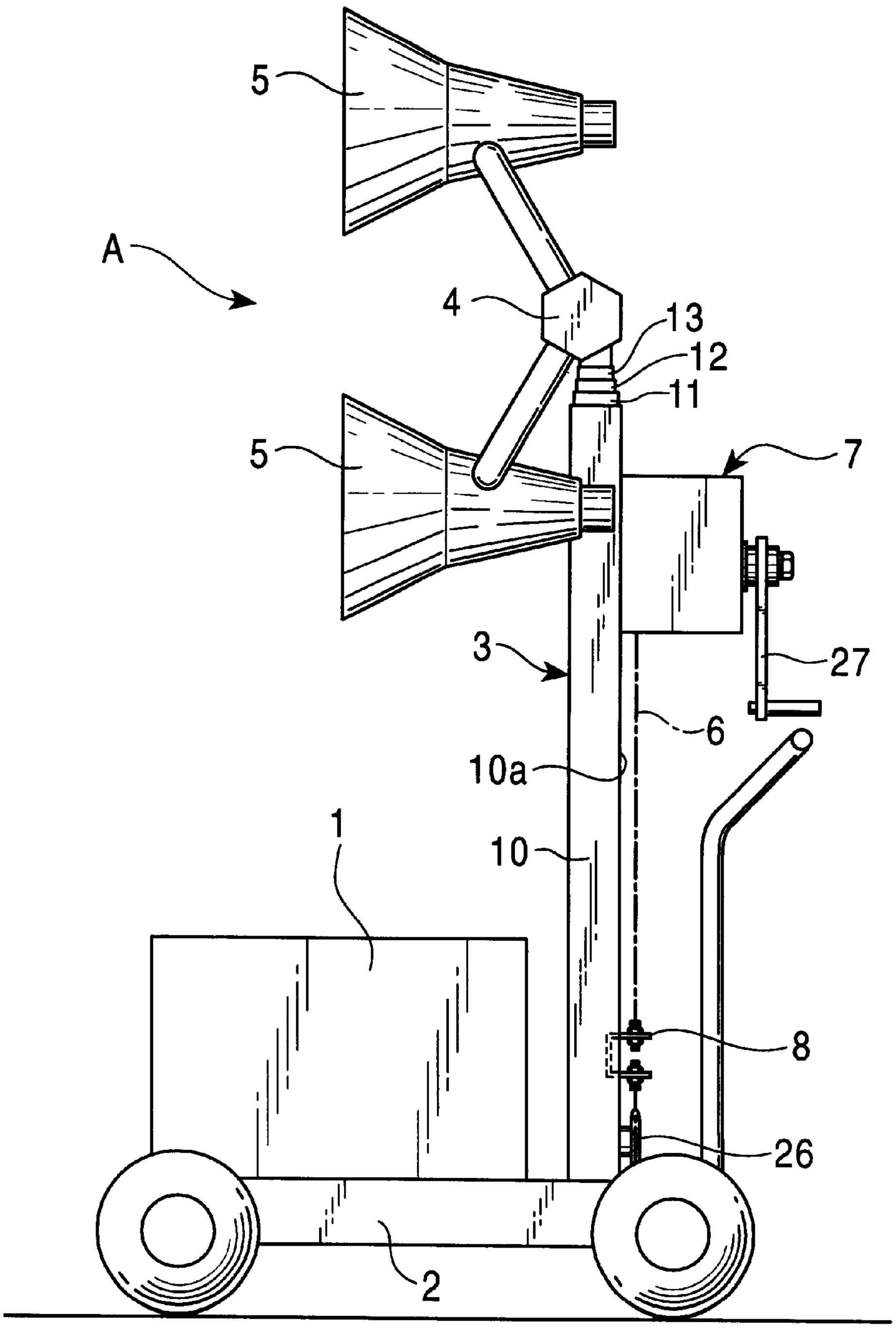
FIG. 1 is a side view showing an example of an embodiment of a projector according to the present invention.
Figure 2A:
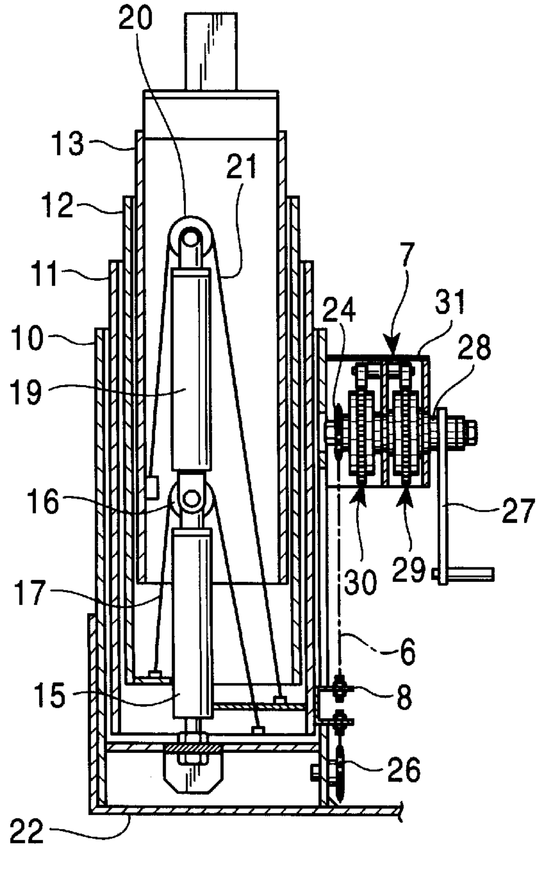
FIG. 2*a* is a vertical sectional view of a telescopic post in a contracted state and FIG. 2*b* is a vertical sectional view of the telescopic post in an extended state.

First, an explanation will be given of a projector and a telescopic post shown by FIGS. 1, 2(*a*), 2(*b*), 3 and 4. As shown by FIG. 1, a projector A of the example is erected with a telescopic post 3 on a carriage 2 mounted with a generator 1, mounted with a required number of illumination devices 5 at an upper portion of the telescopic post 3 via an attachment metal piece 4, hung with an endless member 6 along the telescopic post 3 and installed with a winch 7 for running to rotate the endless member 6 in regular and reverse directions and an ascending and descending member 8 for ascending and descending in accordance with the rotation of the endless member 6.

According to the telescopic post 3, a first pipe post 10 which is a base pipe post fixed on an upper face of the carriage 2, is inserted with successively ascendably and descendably a second, a third and a fourth respective pipe post 11, 12 and 13 which are three middle pipe posts at a lower stage, a middle stage and an upper stage having successively reduced inner diameters.

A first gas damper 15 is fixed to the inside of the second pipe post 11 in an inverted state such that a rod 14 is extracted and retracted in respect of the downward direction, a rod tip portion 14*a* thereof is fixed to an inner bottom portion of the first pipe post 10 and the second pipe post 11 is moved up and down in accordance with extension and contraction of the first gas damper 15.

A first pulley 16 is attached to an upper portion of the first gas damper 15, the first pulley 16 is hung with a first wire 17 one end of which is fixed to a lower portion of the first pipe post 10 and other end of which is fixed to a lower portion of the third pipe pose 12 and the third pipe post 12 is moved up and down in accordance with extension and contraction of the first gas damper 15.

Further, a second gas damper 19 is arranged in an inverted state at an upper portion of the first gas damper 15 such that a rod 18 is extracted and retracted in respect of the downward direction and a rod tip portion 18*a* is fixed to an upper portion of the first gas damper 15. Further, a second pulley 20 is attached to an upper portion of the second gas damper 19, the second pulley 20 is hung with a second wire 21 one end of which is fixed to a lower portion of the second pipe post 11 and other end of which is fixed to a lower portion of the fourth pipe post 13 and the fourth pipe post 13 is moved up and down in accordance with extension and contraction of the second gas damper 19.

The gas dampers are of a well-known structure in the technical field of this kind in each of which a rod is extractably and retractably inserted to an end seal portion of a main body enclosed with gas and oil. According to the example, the gas dampers are constituted such that spring force (F1) of the gas dampers 15 and 19 in a contracted state is set to be substantially equal to load applied on the gas dampers in the telescopic post 3 in the contracted state, that is, total load (F2) of the second through the fourth respective pipe posts 11, 12 and 13, the respective illumination devices 5 attached to an upper end of the fourth pipe post 13, the attachment metal piece 4 and so on to thereby balance a state in which the respective middle pipe posts are disposed at descended positions and the contracted state of the gas dampers.

A base plate 22 is fixed to a lower end portion of the first pipe post 10 by fixedly attaching means of welding or the like and the base plate 22 is fixed removably on the upper face of the carriage 2 by fixing means of fastening by bolts or the like.

As mentioned above, the second pipe post 11, the third pipe post 12 and the fourth pipe post 13 are inserted successively ascendably and descendably into the first pipe post 10 by successively reducing the inner diameters relative to the first pipe post 10. A bottom face 23 is provided at a bottom portion of the second pipe post 11 and the bottom face 23 is fixed with an end portion of a main body portion (cylinder) of the first gas damper 15 on a side thereof for extracting and retracting the rod.

Further, the ascending and descending member 8 is fixed to a side face portion at a vicinity of the bottom face 23 of the second pipe post 11.

Although the endless member 6 may be constituted by a timing belt or the like, the endless member 6 is preferably a roller chain in consideration of reliability and operability and is hung between a drive gear (drive sprocket in this example) 24 supported by an upper portion of an arbitrary side face 10*a* of the first pipe post 10 and a driven gear (driven sprocket in this example) 26 rotatably supported by a shaft 25 projected from a portion below the drive gear 24.

According to the winch 7, a drive shaft 28 connected to a handle 27, the drive gear 24 connected to the drive shaft 28 as well as an ascending brake mechanism 29 and a descending brake mechanism 30, mentioned later, are contained in a box 31 and the box 31 is attached to the first pipe post 10 attachably and detachably by left and right pins 32 installed above the drive gear 24.

That is, left and right frames 33 are projected at positions of the arbitrary one side face 10*a* of the first pipe post 10 above the drive gear 14 and the left and right pins 32 are opposedly installed on inner sides of the two frames 33. In the meantime, the box 31 is formed in a box-like shape where a lower face side and a rear face side are opened, the left and right side face plates are respectively formed with locking long holes 34 substantially in an L-like shape each having an opening at an opening edge on the rear face side and by inserting to lock the left and right pins 32 to the left and right locking long holes 34, the box 31 is attachably and detachably attached to the first pipe post 10.

Figure 3:
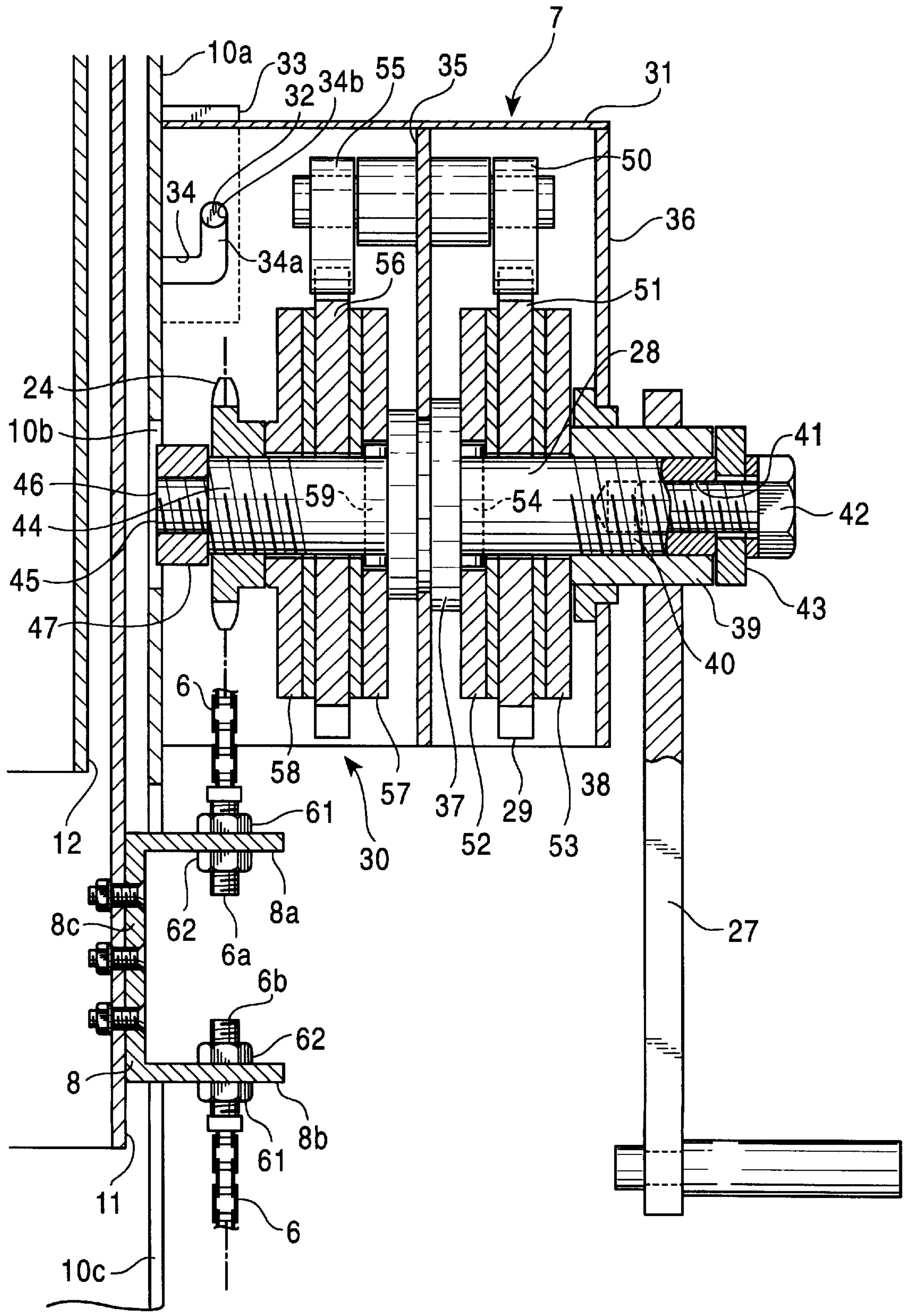
FIG. 3 is a sectional view enlarging a winch.
Figure 4:
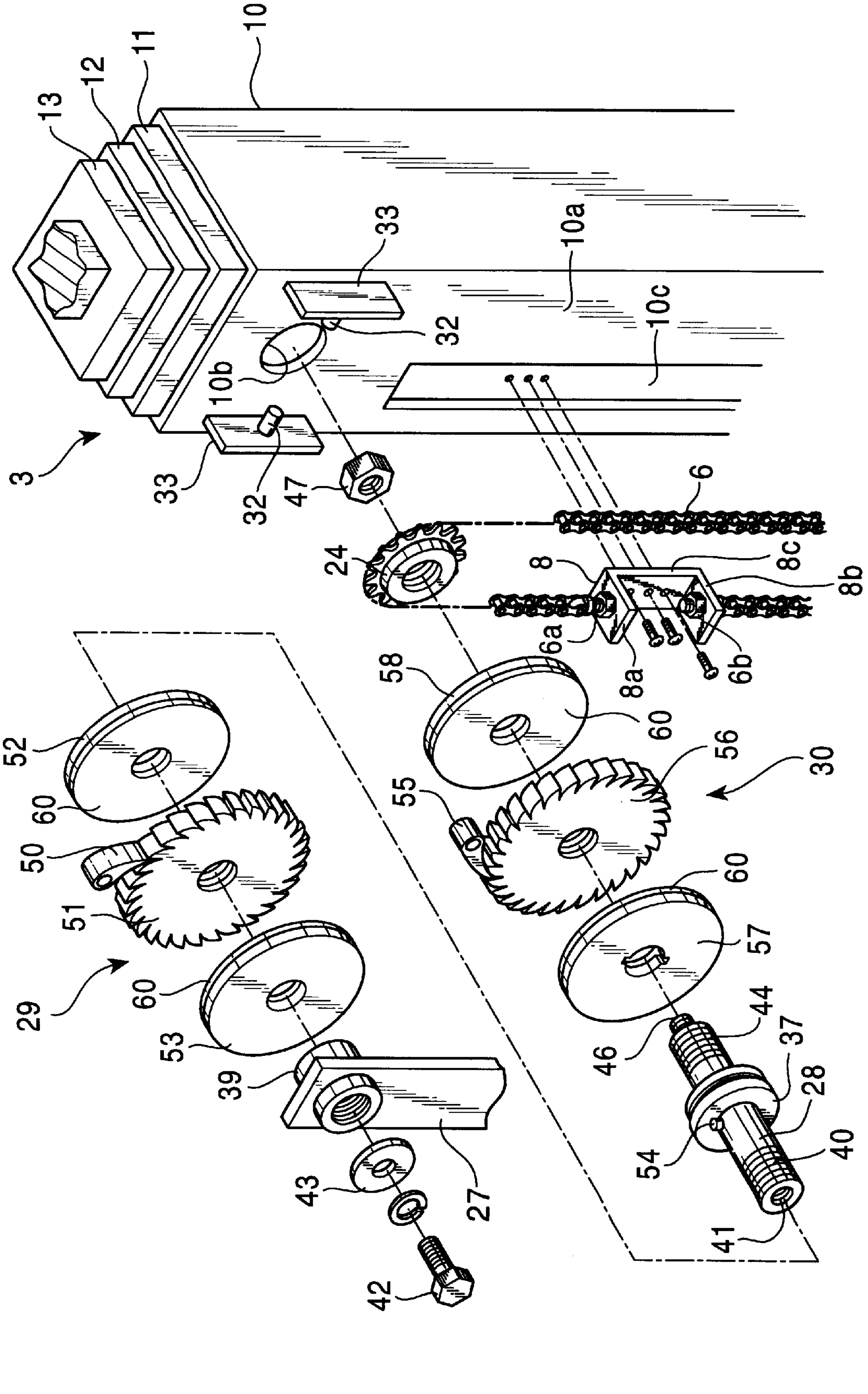
FIG. 4 is a partially enlarged perspective view showing essential portions by disassembling them.

As shown by FIG. 3, a partition plate 35 is installed opposedly to a front plate 36 in the box 31, through holes are opened respectively at the partition plate 35, the front plate 36 and the one side face 10*a* of the first pipe post 10, a bearing 37 is attached to insert into the through hole of the partition plate 35 and the drive shaft 28 is supported rotatably by the bearing 37.

A bearing 38 is attached to insert through the through hole of the front plate 36 and a collar 39 is rotatably supported by the bearing 38. The handle 27 is fixed to the outer periphery of the collar 39 and the collar is rotated along with the handle in regular and reverse directions.

An outer end portion of the drive shaft 28 projected to an outer side of the box 31 is formed with a left-handed screw on its outer periphery and the collar 39 is screwably fitted to the left-handed screw portion 40. Further, a right-handed screw hole 41 is formed at an end face of the end portion, a right-handed bolt 42 is screwed thereto and a ring 43 is fastened to attach by the bolt 42.

An outer periphery of an inner end portion of the drive shaft 28 is formed with a right-handed screw portion 44 and a projected end of the right-handed screw portion 44 is installed with a small diameter portion 45, the outer periphery of the small diameter portion 45 is installed with a left-handed screw portion 46 and screwedly fitted with a nut member 47 and the small diameter portion 45 and the nut member 47 are loosely inserted into a through hole 10*b* of the one side face 10*a* of the first pipe post 10. A right-handed screw portion 44 is screwedly fitted with the drive gear 24.

The ascending brake mechanism 29 is formed between the bearing 37 and the collar 39 and the descending brake mechanism 30 is formed between the bearing 37 and the drive gear 24.

The ascending brake mechanism 29 is externally fitted with an ascending brake ratchet wheel 51 which is in mesh with a claw 50 installed above the drive shaft 28 and is rotatable only in a descending side, rotatably to the drive shaft 28 and is arranged with hold plates 52 and 53 on both left and right sides of the ratchet wheel 51.

The hold plate 52 is fixed unmovably between the ratchet wheel 51 and the bearing 37 by a pin 54 whereas the hold plate 53 is externally fitted movably between the ratchet wheel 51 and the collar 39. Further, in accordance with rotation of the drive shaft 28 to a descending side by a reverse rotational operation of the handle 27, the drive shaft 28 is slid in a direction opposed to the handle 27 (left direction of FIG. 3) by which the hold plates 52 and 53 become proximate to each other to thereby pinch the ratchet wheel 51 and rotation of the drive shaft 28 to an ascending side is regulated. In the meantime, in accordance with rotation of the drive shaft 28 to an ascending side by regular rotational operation of the handle 27, the drive shaft 28 is slid to a direction of the handle 27 (right direction of FIG. 3), by which the hold plate 52 and 53 become remote from each other to thereby release pinching of the ratchet wheel 51.

The descending brake mechanism 30 is externally fitted with a descending brake ratchet wheel 56 which is in mesh with a claw 55 installed above the drive shaft 28 and rotatable only to an ascending side, rotatably to the drive shaft 28 and is arranged with hold plates 57 and 58 on both left and right sides of the ratchet wheel 56.

The hold plate 57 is fixed unmovably between the ratchet wheel 56 and the bearing 37 by a pin 59 whereas the hold plate 58 is externally fitted movably between the ratchet wheel 56 and the drive gear 24. Further, in accordance with rotation of the drive shaft 28 to the ascending side by the regular rotational operation of the handle 27, the drive shaft 28 is slid to a direction of the handle 27 (right direction of FIG. 3), by which the hold plates 57 and 58 become proximate to each other to thereby pinch the ratchet wheel 56 and rotation of the drive shaft 28 to the descending side is regulated. In the meantime, in accordance with rotation of the drive shaft 28 to the descending side by the reverse rotational operation of the handle 27, the drive shaft 28 is slid to a direction opposed to the handle 27 (left direction of FIG. 3), by which the hold plates 57 and 58 become remote from each other to thereby release pinching of the ratchet wheel 56.

Numeral 60 designates friction plates interposed between the respective ratchet wheels 51 and 56 and the respective hold plates 52, 53, 57 and 58.

The ascending and descending member 8 is constituted by a member substantially in a channel-like shape, penetrated with bolt portions 6*a* and 6*b* installed at middle end portions of the endless member 6 at an upper side 8*a* and a lower side 8*b* thereof, fixed to the middle portions of the end less member 6 by detachment prevention and loose fastening by nuts 61 and 62 and ascended or descended by the regular or reverse rotational running of the endless member 6 in accordance with rotation of the drive shaft 28 and the drive gear 24 by operating the handle 27.

A middle vertical portion Bc of the ascending and descending member 8 is formed to fix to a lower portion of the second pipe post 11 to thereby ascend or descend the second pipe post 11 integrally with the ascending and descending member 8.

The one side face 10*a* of the first pipe post 10 is installed with a guide hole 10*c* for guiding ascending and descending of the ascending and descending member 8.

According to the above-described constitution, in the contracted state of the telescopic post 3, the two gas dampers 15 and 19 are also in the contracted state, the ascending and descending member 8 is at a descended position. At this occasion, in the ascending brake mechanism 29, the hold plates 52 and 53 pinch the ratchet wheel 51. In the descending brake mechanism 30, the hold plates 57 and 58 do not pinch the ratchet wheel 56. The drive shaft 28 is in a state of being rotatable only to the descending side. Even when the spring force of the gas dampers 15 and 19 is accidentally operated, so far as the handle 27 is not operated, the drive shaft 28 is not rotated to the ascending side, ascending of the ascending and descending member 8 and the second pipe post 11 is regulated and the telescopic post 3 is not unpreparedly extended.

When the drive shaft 28 is rotated to the ascending side by operating the handle 27 from the state, in the ascending brake mechanism 29, the hold plates 52 and 53 become remote from each other, pinching of the ratchet wheel 51 is released, the drive gear 24 is rotated to the ascending side to thereby ascend the second pipe post 11 along with the ascending and descending member 8, the elastic force of the gas dampers 15 and 19 is operated and the telescopic post 3 is extended.

In this way, by the elastic force and extension and contraction strokes of the two gas dampers 15 and 19, even in the case of the post having a four stage structure, sufficient strokes are provided and the telescopic post 3 can be extended.

Figure 2B:
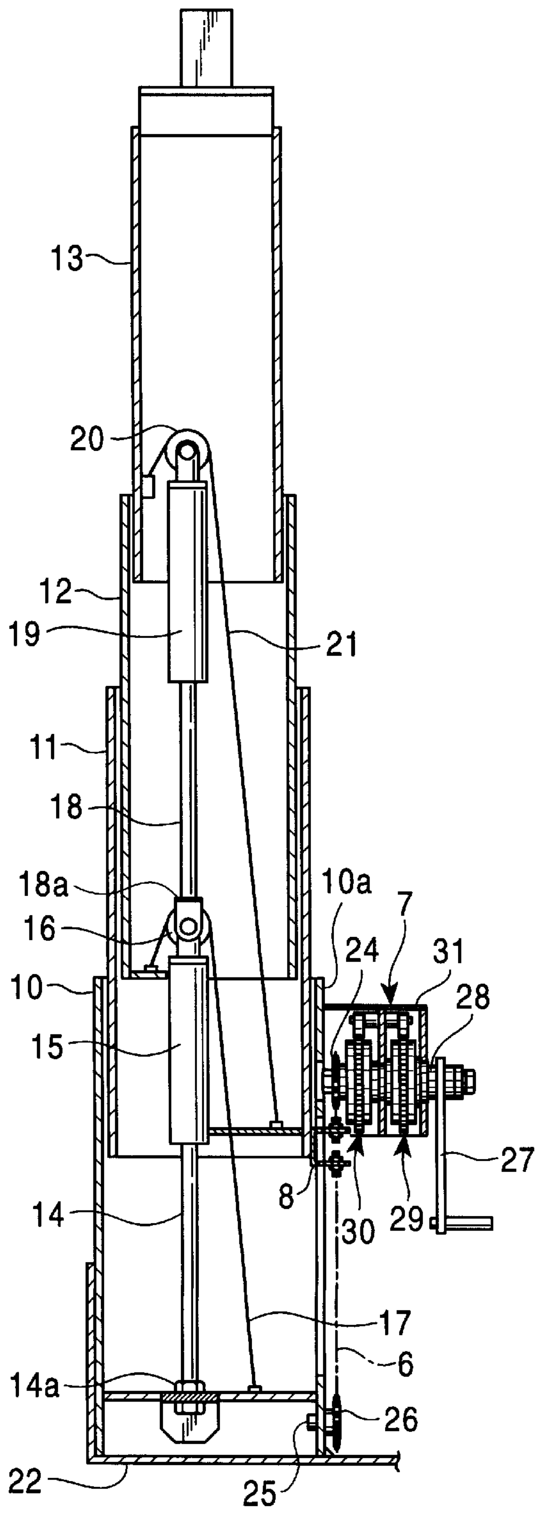

At a time point where the ascending and descending member 8 is ascended to an ascended position, a state in which the two gas dampers 15 and 19 are fully extended, that is, a state in which the telescopic post 3 is extended is brought about (refer to FIG. 2*b*). At this occasion, in the descending brake mechanism 30, the hold plates 57 and 58 pinch the ratchet wheel 56 and in the ascending brake mechanism 29, the hold plates 52 and 53 do not pinch the ratchet wheel 51 and the drive shaft 28 is brought into a state where it can be rotated only to the ascending side. Even when an unpredictable situation of cutting the wire 17 or 21 is accidentally caused, so far as the handle 27 is not operated, the drive shaft 28 is not rotated to the descending side, ascending of the ascending and descending member 8 and the second pipe post 11 is regulated and the telescopic post 3 is not fallen unpreparedly.

When the drive shaft 28 is rotated to the descending side by operating the handle 27 from the extended state, in the descending brake mechanism 30, the hold plates 57 and 58 become remote from each other to thereby release pinching of the ratchet wheel 56, the drive gear 24 is rotated to the descending side to thereby descend the second pipe post 11 along with the ascending and descending member 8 and the telescopic post 3 is contracted along with the gas dampers 15 and 19.

Further, in the contracted state of the gas dampers 15 and 19, by the elastic force, the pins 32 are disposed at deepmost portions 34*b* of vertical portions 34*a* of the locking long holes 34 and the winch 7 cannot be removed under the state. In order to remove the winch 7, in a state in which the gas dampers 15 and 19 are extended, that is, in a state in which the elastic force of the gas dampers is not exerted, the endless member 6 is slackened relative to the drive gear 24 by operating the nuts 60 or 62, thereafter, the box 31 is carried up and the pins 32 are disengaged from the locking long holes 34. Accordingly, there can be prevented occurrence of a contingent accident in which the locking by the ascending brake mechanism 29 is disengaged and the gas dampers 15 and 19 are unpreparedly extended by disengaging the winch 7 in the contracted state of the gas dampers 15 and 19.

Figure 5:
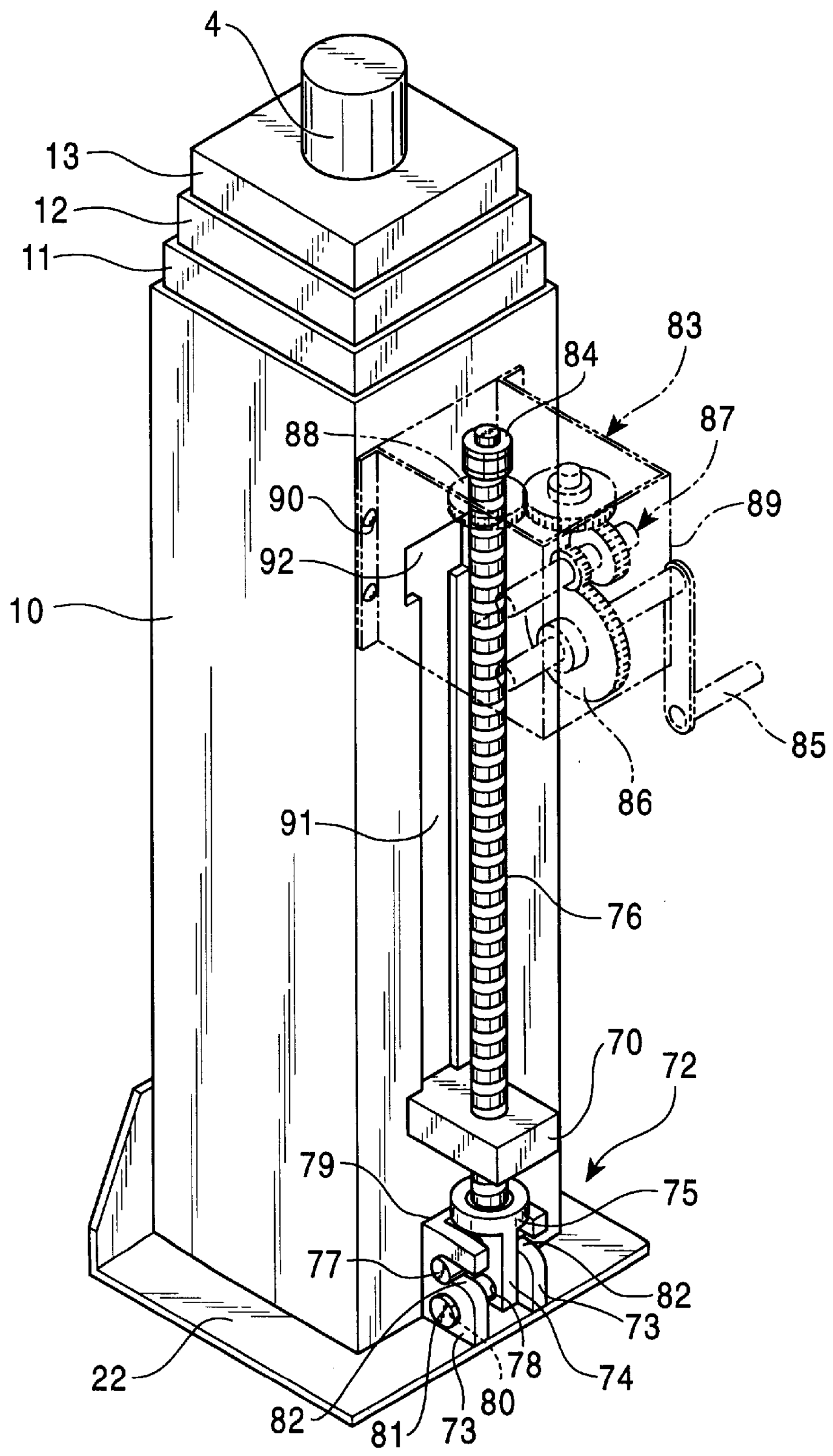
FIG. 5 is a perspective view showing other embodiment of a telescopic post.
Figure 6:
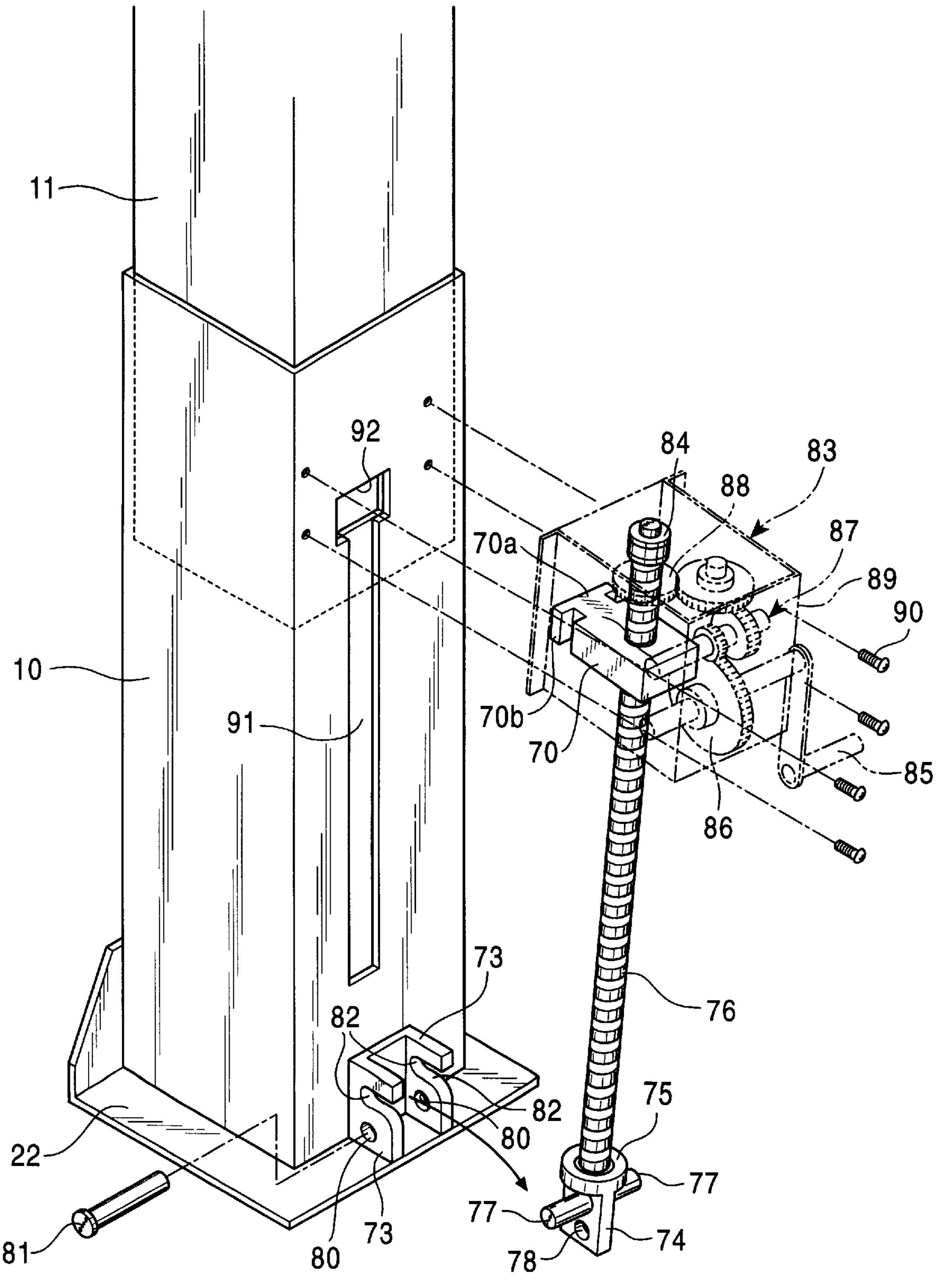
FIG. 6 is a perspective view showing a state in which a screw shaft, a screwing member and a winch are disengaged.

Next, an explanation will be given of the telescopic post 3 shown by FIG. 5 and FIG. 6. The telescopic post 3 shown here is other mode of the telescopic post explained in reference to FIGS. 1–4, portions of illustration and explanation of the constituent portions similar to those described above are omitted and an explanation will be given by centering on points which differ from those of the example shown by FIGS. 1–4 as follows.

A side face portion at a vicinity of a bottom face of the second pipe post 11 in the telescopic post 3, is installed with an engaging portion 71 to which an end portion of a screwing member 70, mentioned later, is engageably and disengageably fixed.

The base plate 22 is formed larger than the bottom face of the first pipe post 10 and a peripheral edge portion thereof is formed with a receiving portion 72 to dispose substantially at a center in a width direction of one side face of the first pipe post 10.

The receiving portion 72 is constituted by left and right fixing pieces 73 fixed to the base plate 22, an attaching and detaching piece attached to the fixing pieces 73 and a bearing 75 installed above the attaching and detaching piece 74.

The bearing 75 rotatably supports a screw shaft 76, installed integrally with the attaching and detaching piece 74 at a lower portion thereof, projected with left and right support pins 77 at the attaching and detaching piece 74 and perforated with a pin hole 78.

The fixing pieces 73 are constituted by left and right side face portions of a fixing piece 79 in a channel shape in plane view, the left and right two fixing pieces 73 are installed with pin holes 80 communicating with the pin hole 78 of the attaching and detaching piece 74 and a pin 81 is inserted through the pin holes 78 and 80 to thereby fix the attaching and detaching piece 74 between the left and right fixing pieces 73.

Further, the two fixing pieces 73 are installed with notches 82 for guiding to insert the left and right support pins 77 of the attaching and detaching piece 74. The notches 82 are formed to be able to guide the support pins 77 such that the attaching and detaching piece 74 is pivoted in a direction to be remote from the first pipe post 10 centering on the pin 81.

The screw shaft 76 is a screw shaft fitted with the screwing member 70 having a ball screw screwably in the up and down direction, a lower end portion thereof is supported by the bearing 75 whereas an upper end portion is supported by a bearing 84 installed in a winch 83 and the screw shaft 76 is erected proximately to one side face of the first pipe post 10 and substantially in parallel with the first pipe post 10 and is rotatably supported by the upper and the lower bearing 75 and 84.

The winch 83 is constituted such that a main gear 86 connected to a handle 85, a reduction gear train 87 in mesh with the main gear 86 and a driven gear 88 and the bearing 84 are contained in a box 89, the box 89 is attachably and detachably attached to a vicinity of an upper end of the first pipe post 10 by fixing means 90 such as bolt and nut fastening and the screw shaft 76 is rotated selectively in the regular and reverse directions by operating to rotate the handle 85 regularly and reversely.

Further, although in this example, there is shown a manual type winch operated by the operation of the handle 85, in place of the handle, there can be used a motor driven type winch having a regularly and reversely rotating motor and a switch for selectively controlling regular and reverse rotation thereof.

The screwing member 70 is provided with a ball screw screwably fitted to the screw shaft 76 and is ascended or descended in accordance with regular or reverse rotation of the screw shaft 76 by operating the winch 73.

An end portion of the screwing member 70 is installed with a small width portion 70*a* insertible into a guide hole 91, mentioned later, and a large width portion 70*b* disposed on an inner side of the guide hole 91 (inner portion of first pipe post 15) and incapable of being extracted and retracted from and to the guide hole 91 and is formed such that by inserting the large width portion 70*b* into the first pipe post 10 via an attachment and detachment hole portion 92, mentioned later, the small width portion 70*a* is slidably inserted into the guide hole 91 and in a region of the guide hole 91, the screwing member 70 is not disengaged from the first pipe post 10.

A side face of the first pipe post 10 opposed to the screw shaft 76, is formed with the guide hole 91 inserted with the end portion of the screwing member 70 such that one end portion cannot be extracted or retracted thereto or therefrom for guiding to ascend or descent the screwing member 70 along the height direction of the first pipe post 10.

Further, an upper end portion of the guide hole 91 is continuously formed with the attachment and detachment hole portion 92 for enabling to extract or retract the end portion of the screwing member 70.

A vicinity of a bottom face of the side face of the second pipe post 11 opposed to the screw shaft 76, is installed with the engaging portion 71 attachably and detachably fixed to the end portion of the screwing member 70 (large width portion 70*b*) by communicating through the attachment and detachment hole portion 92.

According to the above-described constitution, in the contracted state of the telescopic post 3, the two gas dampers 15 and 19 are also in the contracted state, the screwing member 70 is disposed at a vicinity of a lower end of the screw shaft 76 and the screwing member 70 is brought into a locked state and the contracted state of the gas dampers 15 and 19 is maintained. Further, under the state, the end portion of the screwing member 70 is inserted into the guide hole 91 and the screw shaft 76 cannot be disengaged from the first pipe post 10.

When the screw shaft 76 is rotated in the regular direction by operating the winch 83 from the state, in accordance with ascending the screwing member 70, the locked state is released and the elastic force of the gas dampers 15 and 19 is operated to thereby extend the telescopic post 3.

Further, by the elastic force and extension and contraction stroke of the two gas dampers 15 and 19, sufficient stroke is provided to the post having the four stage structure to thereby extend the telescopic post 3.

At a time point in which the screwing member 70 is ascended to a vicinity of an upper end of the screw shaft 76, a state in which the two gas dampers 15 and 19 are fully extended, that is, a state in which the telescopic post 3 is fully extended is brought about. At this occasion, by inserting the end portion of the screwing member 70 into the attachment and detachment hole portion 92, disengaging the attaching and detaching piece 74 from the fixing pieces 73 and disengaging the winch 83 from the first pipe post 10, the screw shaft 76, the winch 83 and the screwing member 70 are integrally disengaged from the first pipe post 10 and maintenance and check of the constituent members or the telescopic post 3 can be carried out (refer to FIG. 6).

When the screw shaft 76 is rotated in the reverse direction by operating the winch 83 from a state in which the telescopic post 3 is extended, in accordance with descending the screwing member 70, the gas dampers 15 and 19 are also contracted and the telescopic post 3 is contracted. Further, at a time point in which the screwing member 70 is descended to the vicinity of a lower end of the screw shaft 76, the telescopic post 3 is brought into a completely contracted state and the screwing member 70 is locked to thereby maintain the contracted state of the gas dampers 15 and 19.

Figure 7B:
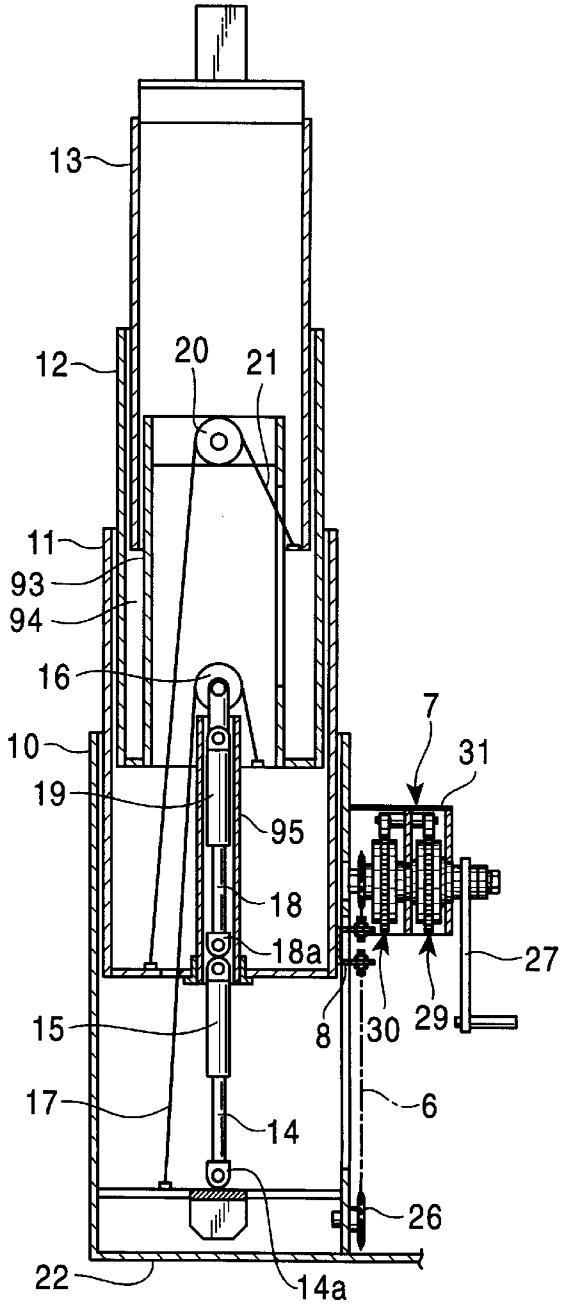
FIGS. 7*a* and 7*b* are perspective views showing still other embodiment of a telescopic post.
Figure 7A:
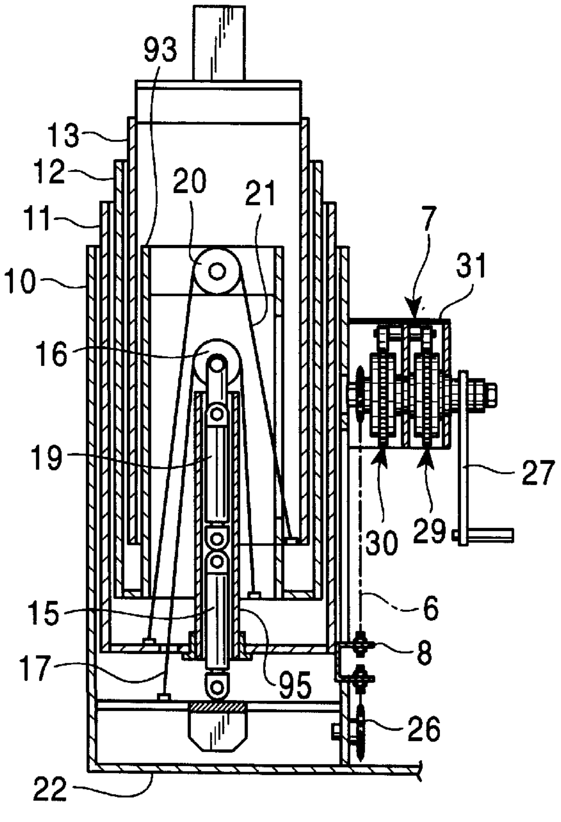
Figure 8:
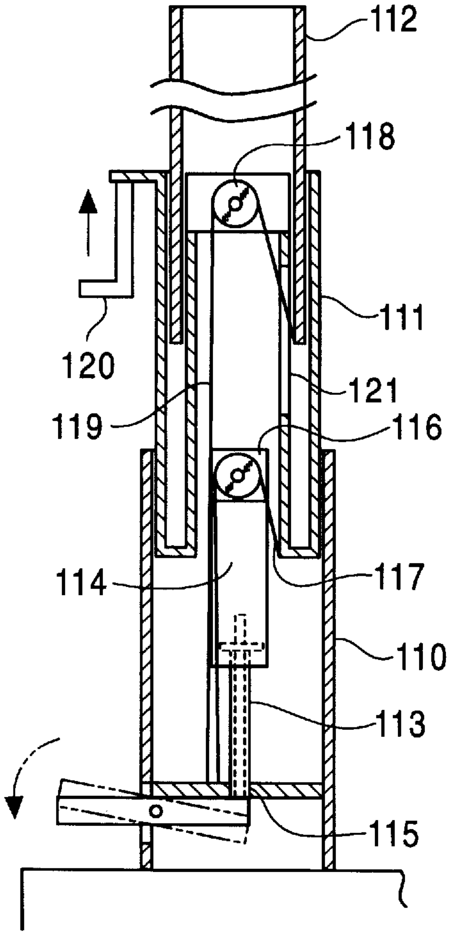
FIG. 8 PRIOR ART
FIG. 8 is a vertical sectional view of a telescopic post according to a conventional technology.
Figure 9:
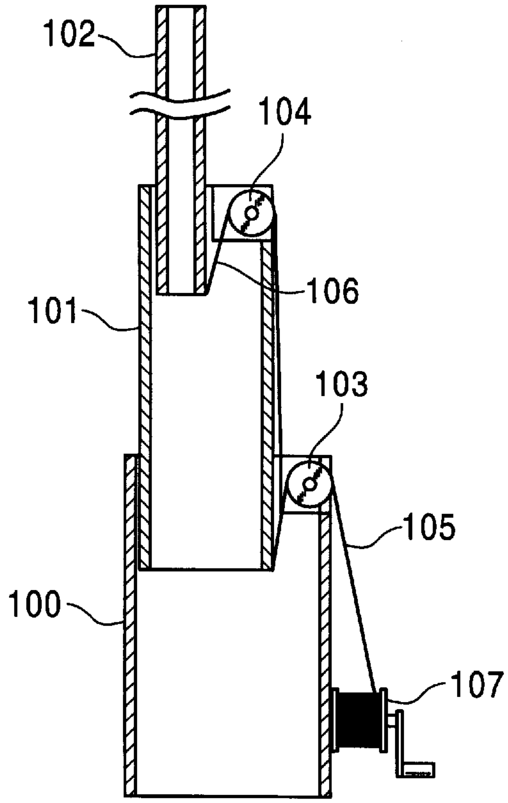
FIG. 9 PRIOR ART
FIG. 9 is a vertical sectional view of a telescopic post according to other conventional technology.

Next, an explanation will be given of a telescopic post shown by FIGS. 7*a* & 7*b*. The telescopic post is other mode of the telescopic post shown by FIGS. 2*a* and 2*b*. An explanation will not be given of constituent portions similar to those in FIGS. 2*a* and 2*b* and an explanation will be given of points of difference as follows. The telescopic post is provided with a structure in which the respective second, third and fourth pipe posts 11, 12 and 13 are inserted into the first pipe post 10 successively ascendably and descendably, a mast pipe post 93 is installed to connect to an inner portion of the third pipe post 12 and the fourth pipe post 13 is contained in a gap portion 94 between the third pipe post 12 and the mast pipe post 93.

A cylindrical member 95 in which the gas dampers 15 and 19 connected in the vertical direction are contained, is installed in the second pipe post 11, the first gas damper 15 is fixed to contain in an inverted state such that the rod 14 is extracted and retracted in respect of the downward direction and the rod tip portion 14*a* is fixed to the inner bottom portion of the first pipe post 10.

The upper portion of the first gas damper 15 is arranged with the second gas damper 19 in the inverted state such that the rod 18 is extracted and retracted in respect of the downward direction and the rod tip portion 18*a* is fixed to the upper portion of the first gas damper 15.

The first pulley 16 is attached to the upper portion of the second gas damper 19 and the first pulley 16 is hung with the first wire 17 one end of which is fixed to the lower portion of the first pipe post 10 and other end of which is fixed to a lower portion of the mast pipe post 93.

Further, the second pulley 20 is attached to the upper portion of the mast pipe post 93 and the second pulley 20 is hung with the second wire 21 one end of which is fixed to the lower portion of the second pipe post 11 and other end of which is fixed to the lower portion of the fourth pipe post 13.

By constituting in this way, in accordance with elongation and contraction of the first and the second gas dampers 15 and 19, the second through the fourth pipe posts 11 through 13 are ascended and descended and the telescopic post 3 is elongated and contracted.

According to such a constitution, extension and contraction strokes of the first and the second gas dampers 15 and 19 are more effectively utilized to thereby facilitate to deal with the telescopic post having the multiple stage structure.

As described above, although an explanation has been given of several examples of embodiments of the projectors and the telescopic posts according to the present invention, the present invention is not limited thereto but is applicable to other different embodiments within the scope of the technical thought specified in the scope of claims according to the invention. It is preferable to pertinently adopt technical thought disclosed in projectors or telescopic posts previously proposed by the applicant (JP-A-8-184217, JP-A-9-161503, Japanese Patent Application Heisei 8-326724 and so on) at pertinent portions of embodiments mentioned above since there can be expected synergic effects between constitutions concerning the previous proposals and constitutions according to the present invention.

A description will be given as follows of effects which can be expected in the present invention in accordance with respective features.

(Feature 1)

In addition to an advantage of the gas damper type telescopic post in which the telescopic post can be elongated and contracted smoothly by light force, by the tandem type gas damper structure, the multiple stage elongation and contraction post structure can easily be dealt with and illumination devices or the like can be set at higher positions. Further, load applied on the individual gas dampers are dispersed which is excellent in safety.

(Feature 2)

Elongation and contraction of the telescopic post and elongation and contraction of the gas dampers are synchronized with each other by handle operation and accordingly, locking of the contracted state and the locking of the extended state of the telescopic post can arbitrarily be controlled which can resolve disadvantages of the conventional technology which needs an operation of moving up and down a handle.

(Features 3 and 4)

Elongation and contraction of the gas dampers are pertinently controlled by the ascending brake mechanism and the descending brake mechanism, there is no concern of amounting to an unexpected accident by extending unpreparedly the post when balance between the elastic force of the gas dampers and the load is collapsed and an effect excellent also in safety is achieved.

Further, ascending and descending of the ascending and descending member is carried out by rotating the drive gear by handle operation to thereby rotate to run the endless member and accordingly, load applied on the handle operation is small and the telescopic post can be elongated and contracted smoothly by a small amount of the rotational operation.

Further, as described in the embodiments, disengagement of the endless member, the drive shaft and so on cannot be carried out in the contracted state of the gas dampers such that tension caused by the elastic force of the gas dampers is applied on the drive shaft or the box containing the drive shaft and so on via the endless member, the drive gear and so on and in the meantime, attachment and detachment of the endless member, the drive shaft and so on can be carried out only when the gas dampers are fully extended and the tension is not exerted by which safety in maintenance and check of the telescopic post, the endless member, the drive gear, the driven gear, the ascending brake mechanism, the descending brake mechanism and so on is further promoted.

(Feature 5)

By screw engagement between the screw shaft and the screwing member, elongation and contraction of the gas dampers can pertinently be controlled, there is no concern of amounting to an unexpected accident by unpreparedly extending the posts when balance between the elastic force of the gas dampers and the load applied on the gas dampers is collapsed and there is achieved an effect excellent in safety.

Further, as described in the embodiments, when the screw shaft is attachably and detachably attached to the base pipe post, the upper end portion of the guide hole is installed with the attachment and detachment hole portion for extracting and retracting the screwing member, attachment and detachment of the screw shaft can be carried out only in a state in which the gas dampers are fully extended, the screw shaft can be disengaged only in a state in which the gas dampers are fully extended (telescopic post is fully extended) and accordingly, safety in maintenance and check of the telescopic post, the screw shaft, the screwing member, the winch and so on is further promoted.

(Feature 6)

The telescopic post having the effect of Feature 3 can be provided widely to various use as the telescopic post which can be used not only for the projector but also in the case in which a sound device such as a speaker or the like or other facility device is attached at an upper portion.

Having described specific preferred embodiments of the invention with reference to the accompanying drawings, it will be appreciated that the present invention is not limited to those precise embodiments, and that various changes and modifications can be effected therein by one of ordinary skill in the art without departing from the scope of the invention as defined by the appended claims.

What is claimed is:

1. A projector comprising:
- a carriage;
- a telescopic post connected to said carriage, said telescopic post including a base pipe post mounted to said carriage and at least one middle pipe post insertable ascendably and descendably into said base pipe post, said at least one middle pipe post having a successively reduced inner diameter;
- at least one illumination device mounted to said telescopic post; and
- a plurality of gas dampers for producing an elastic force to ascend and extend each of said at least one middle pipe post.

2. The projector in accordance with claim 1, wherein said plural gas dampers are arranged in tandem in said telescopic post.

3. The projector in accordance with claim 2, wherein said plural gas dampers are arranged in a vertical direction in said telescopic post.

4. The projector in accordance with claim 1, wherein said plural gas dampers are built-into said telescopic post.

5. The projector in accordance with claim 1, further comprising regulating means for regulating elongation and contraction of said plural gas dampers.

6. The projector in accordance with claim 5, wherein said regulation means comprises:
- a handle rotatable in a first direction and in an opposite second direction;
- a mechanism for extending said telescopic post by rotating said handle in the first direction; and
- a mechanism for contracting said telescopic post by rotating said handle in the second direction.

7. The projector in accordance with claim 1, further comprising:
- a drive gear and a driven gear dispose proximate a side face of said base pipe post;
- an endless member hung between said gears and fixed at a lowermost stage of said middle pipe post;
- an ascending/descending member installed at a middle portion of said endless member;
- a handle connected to said drive gear via a drive shaft, said drive gear being rotatable to an ascending side by rotating said handle in a first direction to ascend said middle pipe post at the lowermost stage along with said ascending/descending member, the elastic force of said plural gas dampers extending said telescopic post, and said drive gear being rotated to a descending side by rotating said handle in an opposite second direction to descend said middle pipe post at the lowermost stage along with said ascending/descending member to contract said telescopic post; and an ascending/descending brake mechanism operatively connected to said drive shaft for regulating rotation of said drive gear to the ascending side when said ascending/descending member is disposed at a descended position, and for regulating rotation of said drive gear to the descending side when said ascending/descending member is disposed at an ascended position.

8. The projector in accordance with claim 7, further comprising:

a descending brake ratchet wheel rotatably mounted to said drive shaft only to the ascending side;

an ascending brake ratchet wheel rotatably mounted to said drive shaft only to the descending side;

a first set of hold plates disposed on a descending brake side and displaceable proximate one another in accordance with rotation of said drive shaft to the ascending side to pinch said descending brake ratchet wheel; and a second set of hold plates disposed on an ascending brake side and displaceable proximate one another in accordance with rotation of said drive shaft to the descending side to pinch said ascending brake ratchet wheel.

9. The projector in accordance with claim 1, further comprising:

a screw shaft disposed proximate said base pipe post;

a winch for rotating said screw shaft in a first direction and an opposite second direction;

a screwing member fitted screwably into said screw shaft, slidably insertable into a guide hole defined longitudinally in said base pipe post, and engaged with a lower end portion of said middle pipe post at a lowermost stage; said gas dampers are expanded and contracted in synchronism with ascending and descending operation of said screwing member by operating said winch to contract said telescopic post.

10. A telescopic post comprising:

a base pipe post;

at least one middle pipe post insertable ascendably and descendably into said base pipe post, said at least one middle pipe post having a successively reduced inner diameter;

a plurality of gas dampers for producing an elastic force to ascend and extend each of said at least one middle pipe post;

a drive gear and a driven gear dispose proximate a side face of said base pipe post;

an endless member hung between said gears and fixed at a lowermost stage of said middle pipe post;

an ascending/descending member installed at a middle portion of said endless member;

a handle connected to said drive gear via a drive shaft, said drive gear being rotatable to an ascending side by rotating said handle in a first direction to ascend said middle pipe post at the lowermost stage along with said ascending/descending member, the elastic force of said plural gas dampers extending said telescopic post, and said drive gear being rotated to a descending side by rotating said handle in an opposite second direction to descend said middle pipe post at the lowermost stage along with said ascending/descending member to contract said telescopic post; and an ascending/descending brake mechanism operatively connected to said drive shaft for regulating rotation of said drive gear to the ascending side when said ascending/descending member is disposed at a descended position, and for regulating rotation of said drive gear to the descending side when said ascending/descending member is disposed at an ascended position.

* * * * *